(12) United States Patent
Ookawara

(10) Patent No.: US 6,669,178 B2
(45) Date of Patent: Dec. 30, 2003

(54) AIR DAMPER USED IN GLOVE BOX OF AUTOMOBILE

(75) Inventor: Toshihiko Ookawara, Yokohama (JP)

(73) Assignee: Piolax, Inc., Kanagawa-ken (JP)

( * ) Notice: Subject to any disclaimer, the term of this patent is extended or adjusted under 35 U.S.C. 154(b) by 23 days.

(21) Appl. No.: 09/811,292

(22) Filed: Mar. 16, 2001

(65) Prior Publication Data

US 2001/0023800 A1 Sep. 27, 2001

(30) Foreign Application Priority Data

Mar. 17, 2000 (JP) .................................. P2000-076112

(51) Int. Cl.[7] .............................. F16F 1/00; B60G 11/56
(52) U.S. Cl. ........................ 267/71; 267/34; 267/226; 267/291
(58) Field of Search .......................... 188/283; 267/71, 267/34, 70, 72, 73, 74, 69, 64.11, 221, 226, 291

(56) References Cited

U.S. PATENT DOCUMENTS

| 199,716 | A | * | 1/1878 | Johnston ..................... 54/46.1 |
| 3,171,643 | A | | 3/1965 | Roos ........................... 267/65 |
| 5,772,188 | A | * | 6/1998 | Lund ........................... 267/69 |
| 5,845,749 | A | | 12/1998 | Moretz et al. ............... 188/281 |
| 6,220,583 | B1 | * | 4/2001 | Ito ............................... 267/226 |

FOREIGN PATENT DOCUMENTS

| EP | 0562284 A1 | 9/1993 | ............. B60R/7/06 |
| FR | 1372781 | 9/1963 | |
| GB | 790647 | 2/1958 | |
| GB | 2065827 A | 7/1981 | ............. F16F/9/00 |
| JP | 2587728 | 9/1993 | |
| JP | 2557064 | 10/1993 | |

OTHER PUBLICATIONS

Search Report.

* cited by examiner

*Primary Examiner*—Jack Lavinder
*Assistant Examiner*—Melody M. Burch
(74) *Attorney, Agent, or Firm*—Howard & Howard

(57) ABSTRACT

An air damper suitably used in the glove box of an automobile comprises a cylinder having a first open end and a second end, a guide cap covering the first open end, and a piston moveable in the cylinder. A compression coil spring is inserted into the cylinder between the piston and the guide cap. The coil spring forces the piston toward the second end of the cylinder in the free state. The piston has a hook piece, which is threaded with a string. At least one end of the string is taken out of the cylinder via the guide cap, and connected to the glove box. The guide cap has a stopper means projecting inside the coil spring and toward the piston. When the glove box is opened and the string is pulled out of the cylinder, the piston moves toward the guide cap. The piston then strikes the stopper means of the guide cap before the coil spring is fully compressed.

6 Claims, 5 Drawing Sheets

AIR DAMPER USED IN GLOVE BOX OF AUTOMOBILE

The present patent application claims the benefit of earlier Japanese Patent Application No. 2000-76112 filed Mar. 17, 2000, the disclosure of which is incorporated herein by reference.

BACKGROUND OF THE INVENTION

1. Field of the Invention

The present invention generally relates to an air damper, and more specifically, to an improved structure of a cylindrical air damper installed in, for example, the glove box of an automobile.

2. Description of the Related Art

A conventional cylindrical air damper fixed to the glove box of an automobile is disclosed in, for example, Japanese Utility model Registration No. 2557064. This type of air damper is used to dampen the abrupt opening motion of the glove box, or to prevent unpleasant noise due to sudden opening. The air damper allows the glove box to open slowly by pivoting about the pivoting axis against the gravitational force.

The conventional air damper comprises a cylinder with openings at both ends, and a piston moving in the cylinder. A string is coupled with the piston, and it extends out of the cylinder from the remote end. A valve is attached to the base or the close end to control the quantity of the air passing through the cylinder. A guide cap is attached to the remote end of the cylinder to guide the string. A compression coil spring is inserted between the guide cap and the piston.

The air damper is fixed to, for example, the instrument panel, which is the back wall of the glove box. The string extending from the guide cap of the cylinder is coupled to the glove box. When the glove box is unlocked to start opening, the string is pulled out of the cylinder, and the piston coupled to the spring moves inside the cylinder, while compressing the coil spring. Consequently, the air flows into the cylinder via the valve, which gives the damper effect to the cylinder. With this arrangement, the glove box slowly opens toward the opening position.

When the glove box is pushed toward the closed position, the piston is pushed back towards the valve by the restoring force of the compression coil spring, pulling the string back inside the cylinder. At this time, the valve is open to let the air stored in the cylinder to escape, and accordingly, the piston moves back to the home position smoothly.

The full open position of the glove box using an air damper has to be regulated. In general, a guide groove is formed in the instrument panel itself or the cover sheet furnished to an appropriate place on the instrument panel, as disclosed in Japanese Utility Model No. 2587728. A stopper pin is provided to the side face of the glove box in such a manner that the stopper pin moves along the guide groove as the glove box is opened or closed. If the glove box slowly opens by its own weight, the stopper pin moves in the groove, and comes to the end of the groove. The abutment between the stopper pin and the end of the groove regulates the full open position of the glove box.

However, providing a separate component for regulating the full open position of the glove box causes the entire structure of the glove box to become complicated, while limiting the storage capacity of the box. It may be proposed that the air damper itself be used to regulate the full open position of the glove box, making use of the maximum compressed position of the spring. Using the air damper as the open position regulation means, however, causes other problems. The compression coil spring is weakened due to excessive load of the glove box, brittle portions of the air damper may be broken, and the full open position fluctuates because of the spring force. These problems have prevented the air damper from being used as the open position regulation means as it is.

SUMMARY OF THE INVENTION

Therefore, the invention was conceived to overcome these problems in the prior art technique. The major objective of the invention is to provide an improved structure of an air damper used in the glove box of an automobile. The improved air damper is capable of functioning as a means for regulating the full open position of the glove box, without causing the compression coil spring of the air damper to be damaged or deteriorated.

To achieve the objective, an air damper according to the invention comprises a cylinder with a first open end and a second end, a guide cap covering the first open end, and a piston moveable in the cylinder. A compression coil spring is inserted in the cylinder between the piston and the guide cap. The coil spring forces the piston toward the second end of the cylinder in the free state. A string is coupled with the piston, and it extends out of the cylinder. As a feature of the invention, a stopper means is positioned between the guide cap and the piston n order to stop the piston before the compression coil spring is fully compressed when the string is pulled to cause the piston to move toward the guide cap.

The stopper means is located inside the compression coil spring. This arrangement allows the air damper to be kept compact, without requiring an extra space for accommodating the coil spring.

The stopper means is connected to the guide cap, or alternatively, the stopper means is connected to the piston.

Preferably, the piston has a hook piece facing the guide cap. The hook piece is threaded with the string in such a manner that at least one end of the string is taken out of the cylinder via the guide cap. In other words, the string is doubled at the hook piece, and moveable through the hook piece. The one end of the string is coupled with the side edge of the glove box. When the glove box is opened, the string is pulled out of the cylinder, which causes the piston to move toward the guide cap. Since there is a stopper means between the piston and the guide cap, the piston strikes the stopper means before the compression coil spring is fully compressed. This arrangement can prevent the coil spring from being deteriorated due to excessive load by the weight of the glove box. Simultaneously, the stopper means reliably defines the full open position of the glove box, because the glove box is retained in a stable manner at a position determined by the length of the stopper means.

BRIEF DESCRIPTION OF THE DRAWINGS

Other objects, features, and advantages of the invention will be apparent from the following detailed description in conjunction with the attached drawings, in which.

DETAILED DESCRIPTION OF THE PREFERRED EMBODIMENT

Figure 1:
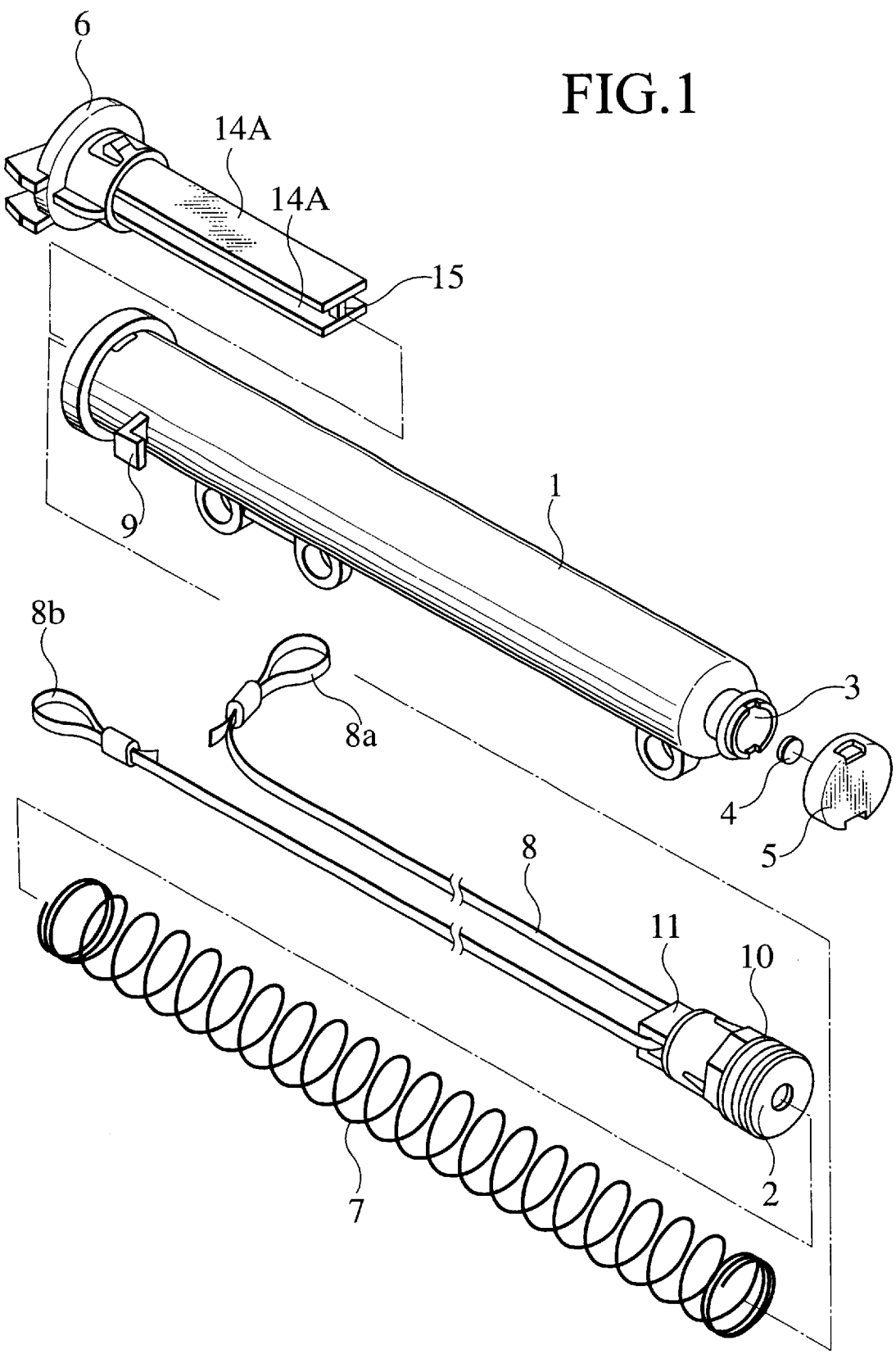
FIG. 1 is an exploded perspective view of an air damper according to the preferred embodiment of the invention.

FIG. 1 illustrates an example of the air damper according to the preferred embodiment of the invention in an exploded view. The air damper comprises a cylinder 1 having a first open end 13 (FIG. 4) and a second open end 3, and a piston 2 accommodated in the cylinder so as to be moveable along the axis of the cylinder 1. The first opening 13 functions as a leading port, and the second opening 3 functions as an air hole 3. A string 8 is coupled to the piston 2 in order to transfer a damper effect generated by the motion of the piston 2 to the glove box (not shown). The string 8 may be a lace, a cord, a belt, or the like. A guide cap 6 is provided to the lading port to guide the string 8 out of the cylinder 1. An end cap 5 is provided to the air hole 3 with an air valve 4 between them. The air damper also has a compression coil spring 7, which is inserted in the cylinder 1 between the piston 2 and the guide cap 6. In the free state, the spring 7 forces the piston 2 toward the end cap 5.

The cylinder 1 has an L-shaped hook 9 on its outer face near the leading portion order to hook one end 8a of the string 8. The piston 2 has O-rings 10 around the outer face, and a hook piece 11 threaded with the string 8. The string 8 is doubled at the hook piece 11 in a moveable manner, and extends in the axial direction in the cylinder 1. As has been mentioned above, one end 8a of the string 8 is hooked at the L-shaped hook 9, and the other end 8b is coupled to a side edge of the glove box (not shown). In this example, the ends 8a and 8b are looped.

Figure 2:
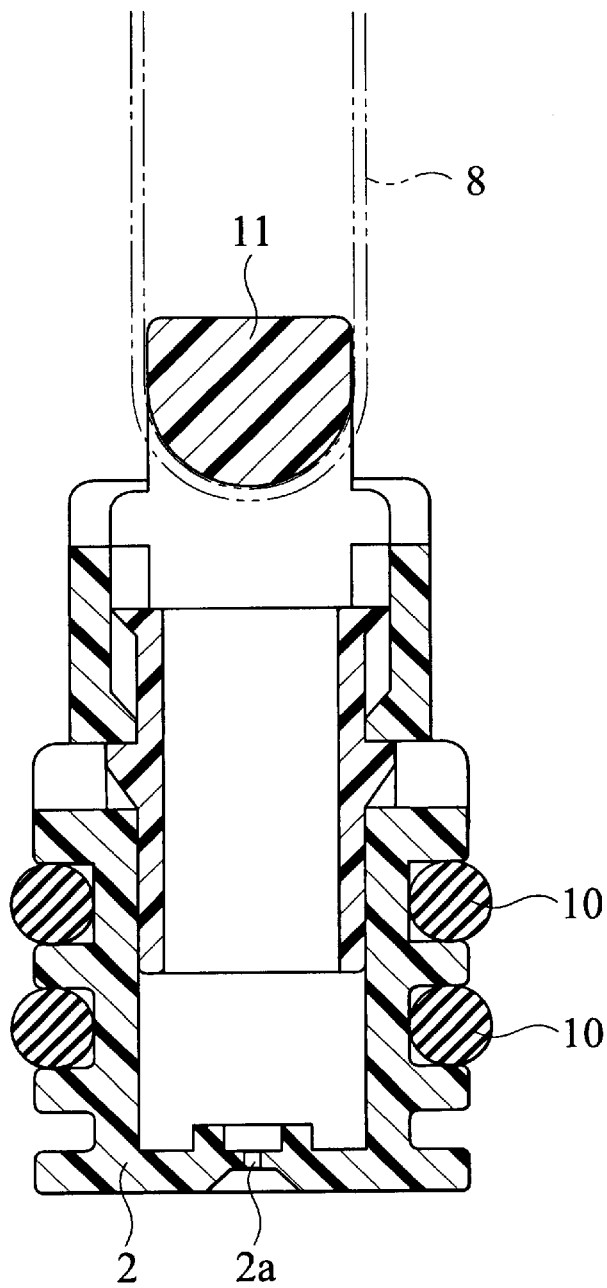
FIG. 2 is a cross-sectional view of the piston used in the air damper shown in FIG. 1.

FIG. 2 illustrated in a cross-section view the piston 2, to which a string 8 (illustrated by a ghost line) is coupled. The O-rings 10 are fit into the threaded forms in the outer face of the piston 2. The hook piece 11 has a swelling wall, which functions as a reel to allow the string 8 to be pulled in both directions. The piston 2 has an orifice 2a at the bottom face.

Figure 3:
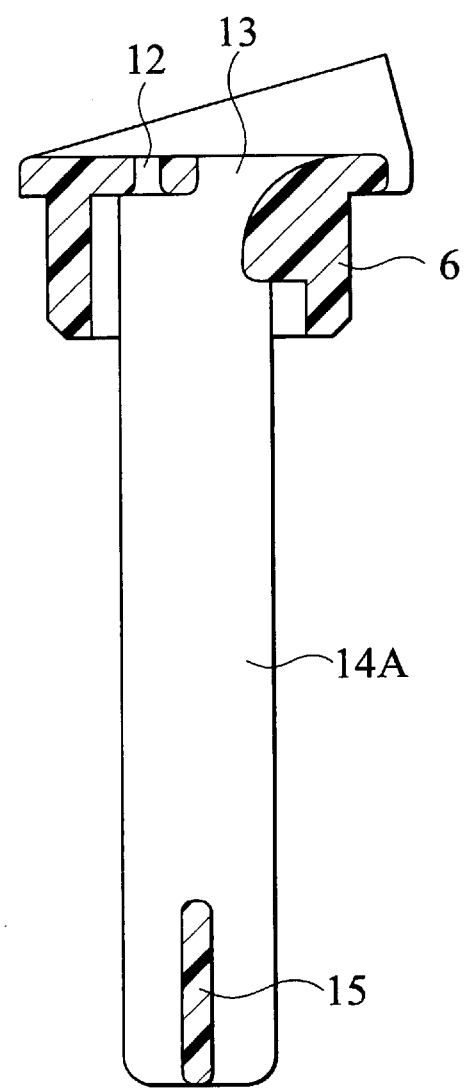
FIG. 3 is a cross-sectional view of the guide cap used in the air damper shown in FIG. 1.

FIG. 3 illustrates in a cross-sectional view the guide cap 6 provided to the leading port of the cylinder 1. As is illustrated in FIGS. 1 and 3, the guide cap 6 has a pair of stopper plates 14a, between which a partition 15 is inserted. The guide cap 6 has a hole 12 for receiving one end 8a of the string 8, and a guide hole 13 for allowing the other end 8b of the string 8 to be pulled out of the cylinder 1. Both ends 8a and 8b of the string 8 doubled at the hook piece 11 are separated by the partition 15 and inserted in the holes 12 and 13, respectively.

The stopper plates 14a extend inside the compression coil spring 7 toward the hook piece 11 of the piston 2. This arrangement eliminates necessity for an extra space, and prevents the cylinder 1 from becoming large.

Figure 4:
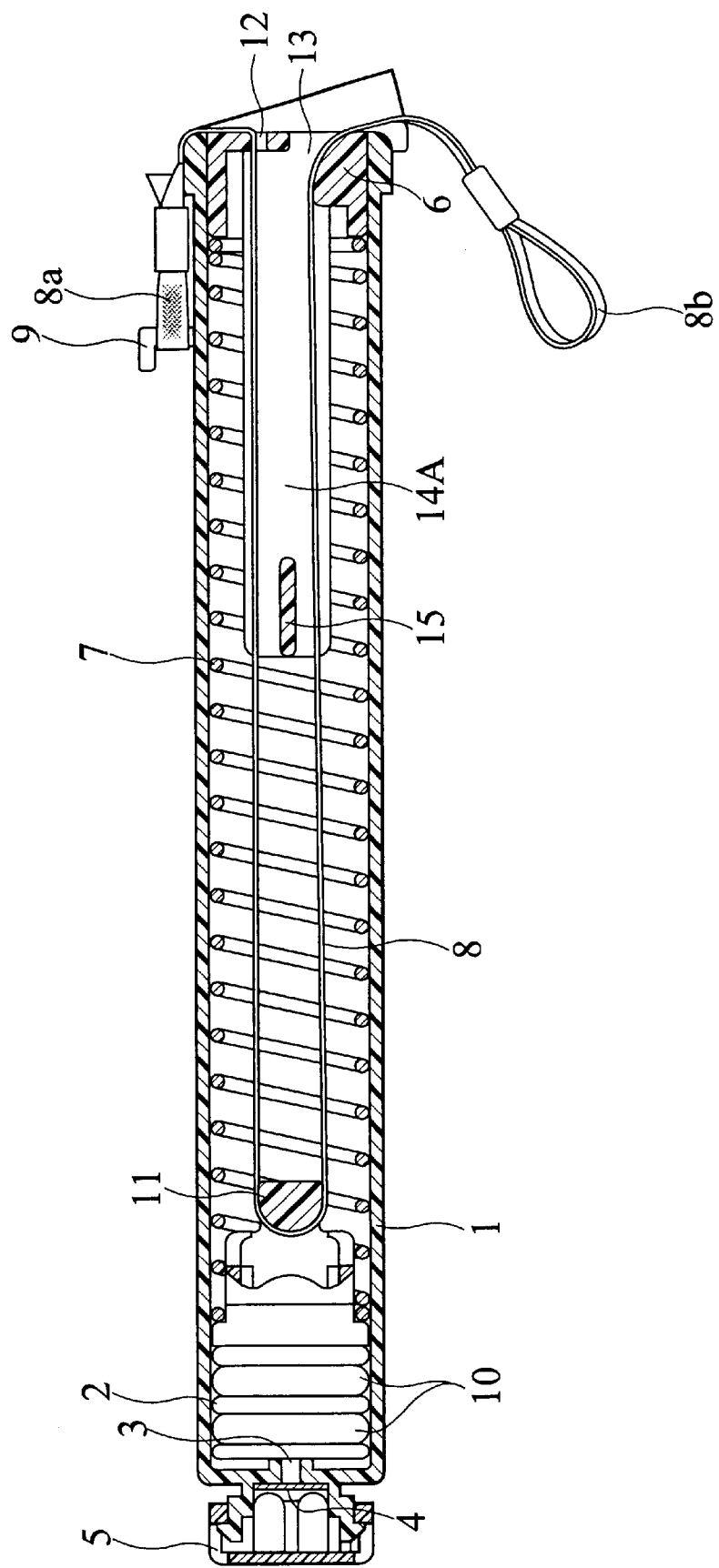
FIG. 4 is a cross-sectional view of the air damper assembled into a single unit.

When assembling the air damper shown in FIGS. 1 through 3, the string 8 is threaded in the hook piece 11 of the piston 2, and pulled in double inside the compression coil spring 7. Then, the piston 2 and the compression coil spring 7 are inserted into the cylinder 1 from the lading port. The hole 12 of the guide cap 6 is threaded with one end 8a of the spring 8, while the guide hole 13 of the guide cap 6 is threaded with the other end 8b of the spring 8, before the guide cap 6 is fixed to the cylinder 1. The guide cap 6 is then attached to the cylinder 1, and one end 8a of the spring 8 is hooked at the L-shaped hook 9. In this manner, the air damper is assembled into a single unit, as shown in FIG. 4. The stopper plates 14a of the guide cap 6 project into the cylinder 1 inside the compression coil spring 7.

When installing the air damper in the glove box of an automobile, the cylinder 1 of the air damper is secured to the instrument panel (not shown) or the cover (not shown) attached to an appropriate lace on the instrument panel. Then, the looped end 8b of the spring 8 extending from the guide cap 8 is pulled out of the cylinder 1, and coupled to the side edge of the glove box. In the preferred embodiment, the spring 8 is doubled in the cylinder, and therefore, the amount of pull of the spring 8 is twice as much as the displacement of the piston 2.

When the glove box is unlocked, the glove box pivots about its axis and starts opening under the gravitational force. As the glove box opens, the spring 8 is pulled out of the cylinder 1, and the piston 2 moves toward the guide cap 6, while compressing the compression coil spring 7. The air compressed in the cylinder starts flowing through the orifice 2a of the piston 2, and the flow resistance of the air flowing through the orifice 2a generates a damper effect which prevents the glove box from abruptly opening. As a result, the gentle opening of the glove box is guaranteed.

Figure 5:
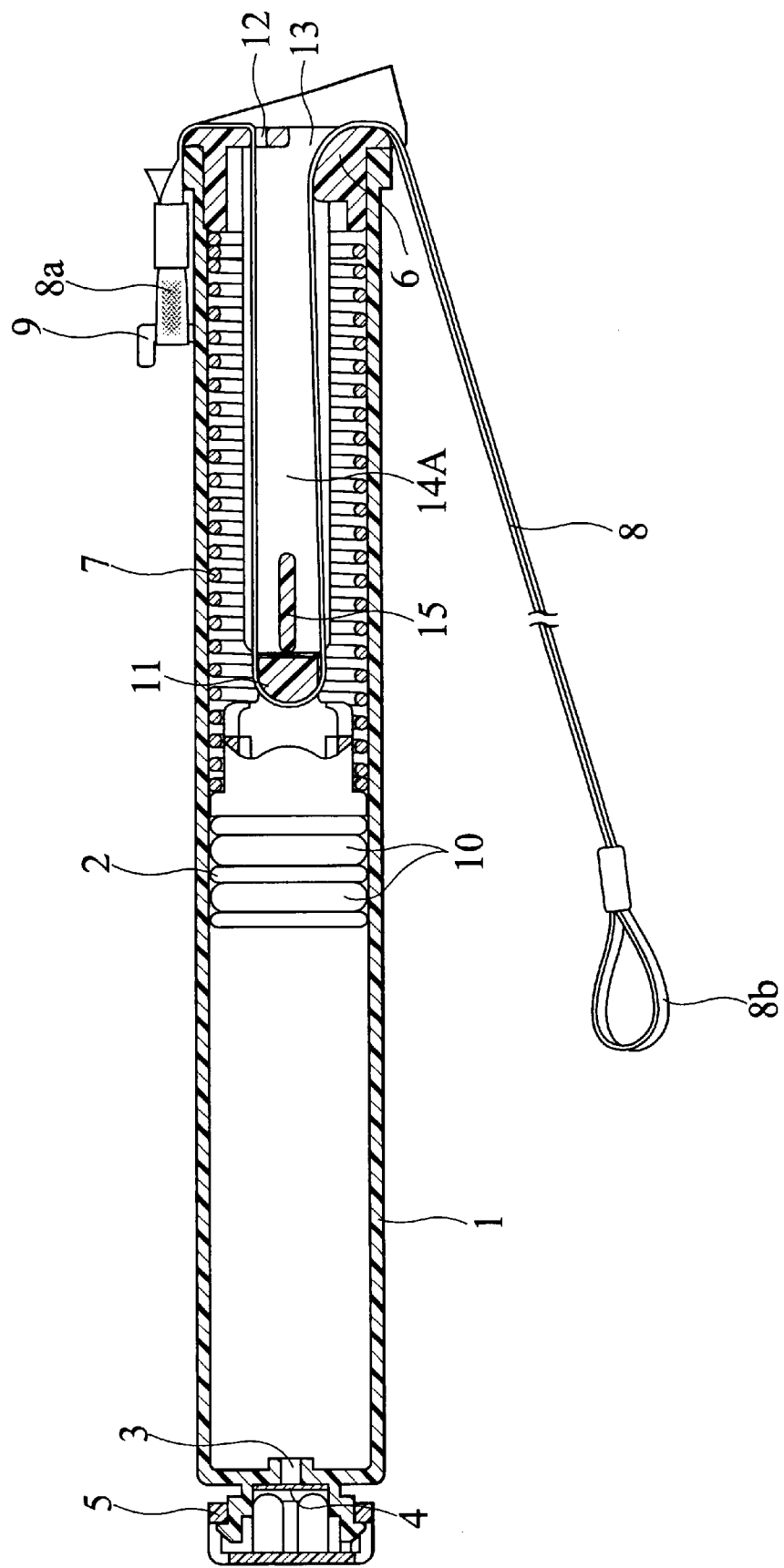
FIG. 5 is illustrates in a cross-sectional view the air damper when the glove box is at the full open position, with the piston in contact with the abutment wall of the guide cap.

Then, the hook piece 11 of the piston 2 hits the tips of the stopper plates 14a projecting from the guide cap 6 before the compression coil spring 7 is completely compressed, as illustrated in FIG. 5. The stopper plates 14a prevent the piston 2 from further advancing toward the guide cap 6. In other words, the full open position of the glove box is defined in a stable manner by the abutment between the piston 2 and the stopper plates 14a without causing undesirable fluctuation in the full open position. This arrangement does not require an additional separate means for regulating the full open position.

Because the compression coil spring 7 is not fully compressed even if the glove box is held at the full open position, the spring force will not be weakened. In addition, the air damper is protected from being damaged or broken due to the full compression of the coil spring.

When returning the glove box to the close position, the piston 2 is pushed back toward the end cap 5 by the restoring force of the compression coil spring 7, accompanying the string 8. During the return motion of the piston 2, the valve 4 is opened, and the air stored between the piston 2 and the end cap 4 is escaped via the valve 4 into the atmosphere so as to guarantee the smooth return of the piston 2.

Figure 6:
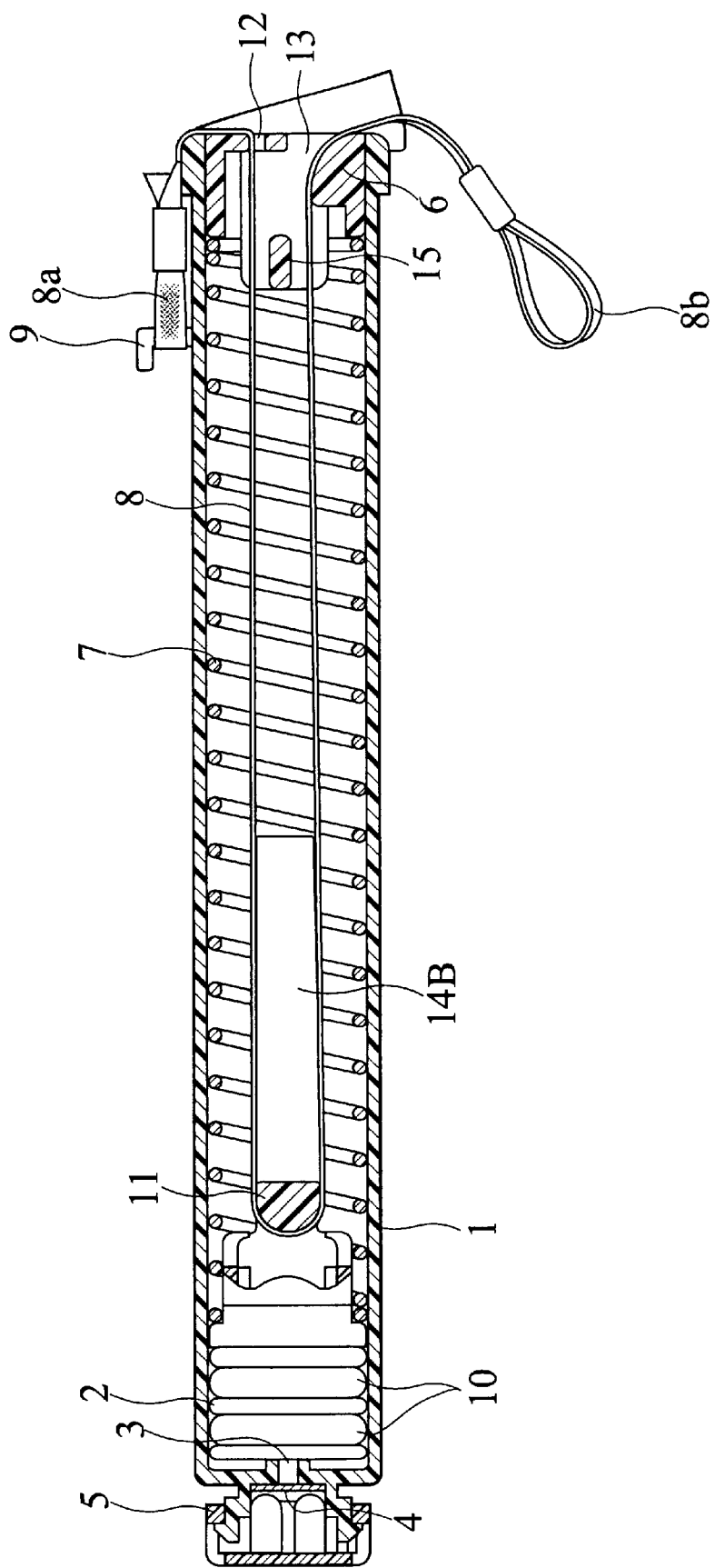
FIG. 6 is a cross-sectional view of a modification of the air damper shown in FIGS. 1 through 5.

FIG. 6 illustrates a modification of the air damper, in which the stopper plates 14b are furnished on the piston 2 on both sides of the hook piece 11. In the example shown in FIG. 6, the stopper plates 14b project toward the guide cap 6 inside the compression coil spring 7. As in the arrangement shown in FIGS. 1 and 5, the air damper can be kept compact because the stopper plates 14b are accommodated inside the coil spring 7.

With the modification shown in FIG. 6, the tips of the stopper plates 14b projecting from the piston 2 hit the guide cap 6 before the compression coil spring 7 is fully compressed. The abutment between the stopper plates 14b and the guide cap 6 prevents the piston 2 from further advancing toward the guide cap 6 and defines the full open position of the glove box in a stable manner. Since the compression coil spring 7 is protected from an excessive amount of load, it will not be weakened even if the glove box is held at the full open position. The air damper itself is also protected from being damaged or broken at brittle portions.

The full open position of the glove box is easily adjusted simply by setting the length of the stopper plates 14a or 14b to an appropriate value.

As has been described, the air damper of the present invention guarantees gentle opening of the glove box, and at the same time, it functions as a means for regulating the full open position of the glove box. In addition, the full open position of the glove box can be easily adjusted simply by changing the length of the stopper plates.

Because the stopper plates prevent the compression coil spring from being fully compressed under the excessive amount of load, the air damper works in a reliable manner without being damaged or broken due to deterioration of the coil spring.

Although the present invention has been described based on the preferred examples, the invention will not be limited to these examples. It should be appreciated hat there are many modifications and substitutions without departing from the scope of the invention, which are defined by the appended claims.

What is claimed is:

1. An air damper comprising:

a cylinder having a first open end an a second end;

a guide cap covering the first open end, the guide cap having a stopper means projecting into the cylinder;

a piston moveable in the cylinder;

a compression coil spring inserted in the cylinder between the piston and the guide cap and for forcing the piston toward the second end of the cylinder; and a string coupled with a piston and extending out of the cylinder via the guide cap;

wherein the piston strikes the stopper means of the guide cap before the compression coil spring is fully compressed when the string is pulled by an external force.

2. The air damper of claim 1, wherein the piston has a hook piece that is threaded with the string and at least one end of the string is taken out of the cylinder.

3. An air damper comprising:

a cylinder having a first open end and a second end;

a guide cap covering the first open end;

a piston moveable in the cylinder and having a stopper means projecting toward the guide cap;

a compression coil spring inserted in the cylinder between the piston and the guide cap and for forcing the piston toward the second end of the cylinder; and a string coupled with the piston and extending out of the cylinder wherein the stopper means of the piston strikes the guide cap before the compression coil spring is fully compressed when the string is pulled by an external force.

4. The air damper of claim 3, wherein the piston has a hook piece that is threaded with the string and at least one end of the string is taken out of the cylinder.

5. An air damper comprising:

a cylinder having a first open end and a second end;

a guide portion covering the first open end, the guide portion having an extended stopper projecting into the cylinder and an end piece;

a piston movable in the cylinder;

a compression coil spring inserted in the cylinder between the piston and the guide portion, the compression coil spring forcing the piston toward the second end of the cylinder; and a string coupled with the piston and extending out of the cylinder via the guide portion;

wherein the piston strikes the extended stopper of the guide portion before the compression coil spring is fully compressed when the string is pulled to cause the piston to move toward the guide portion.

6. The air damper of claim 5, wherein the piston has a hook piece, the string is movably threaded thereto to be doubled and at least one end of the doubled string is taken out of the cylinder via the guide portion.

* * * * *